April 12, 1927.
G. M. ROSEMIER
1,624,436
AUTOMOBILE LIGHT
Filed Oct. 21, 1922
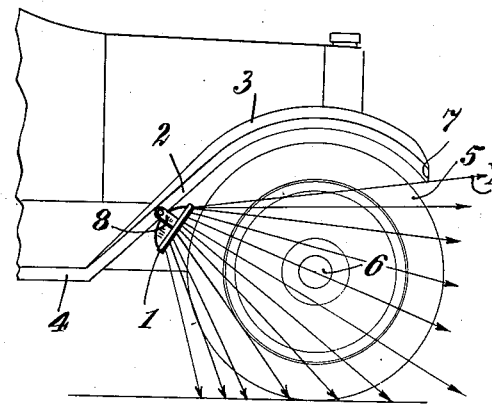
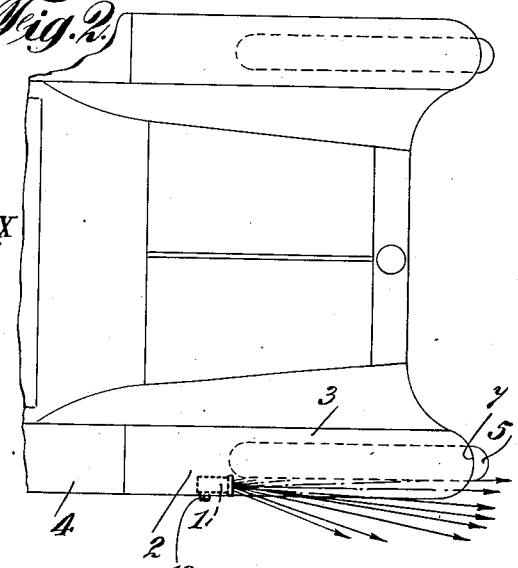
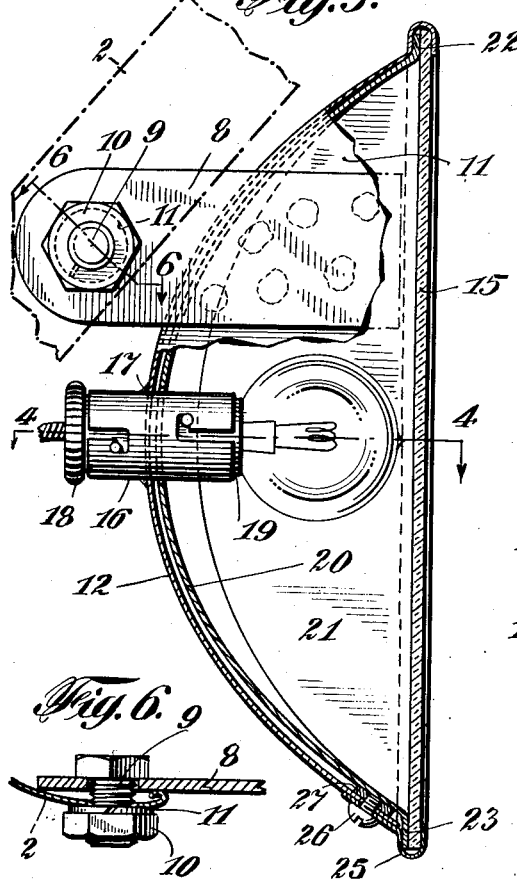
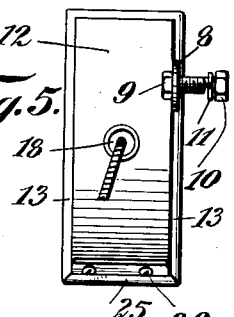
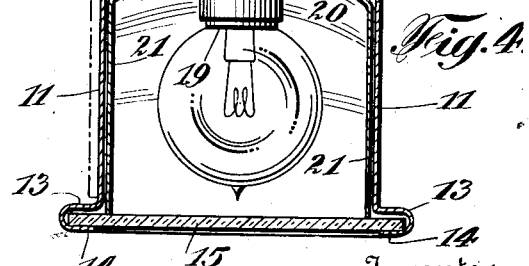
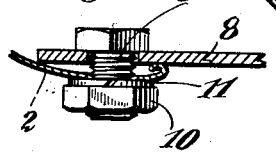
Inventor
George M Rosemier
By
George O. Mean
Attorney Patented Apr. 12, 1927.

1,624,436

UNITED STATES PATENT OFFICE.

GEORGE MARTIN ROSEMIER, OF NEW YORK, N. Y., ASSIGNOR TO THE PROTECTOLITE CO., INC., OF NEW YORK, N. Y., A CORPORATION OF NEW YORK.

AUTOMOBILE LIGHT.

Application filed October 21, 1922. Serial No. 595,932.

My present invention involves the discovery of a novel and particularly advantageous location for a supplemental headlight on an automobile. Heretofore the well known spot light has been the usual means for getting a good light on the gutters and ditches of country roads or the curbs nearer the centre of civilization. The spot light is open to the objection that it throws a bright beam across the field of vision of the driver and diffuses a strong light on the hood of the automobile creating a more or less brilliant field which is difficult for the driver to see through in clear weather and becomes dangerous when there is any mist or fog in the air.

My invention includes the discovery that a headlight of almost any desired vertical height and of a width substantially less than the height can be located under the outer edge of a forward mud guard a short distance above the level of the running board in such a position as to be outside of the right-hand wheel but sufficiently near of the plane thereof so that the shadow of the tire shoes, rim, spokes and hub, instead of obstructing the vision of the gutter, is actually cast almost straight forward down the road. Consequently the shadow of the wheel will shield the light from any automobile or pedestrian obeying the rules of the road. The height of the light is such with respect to the forward tip of the mud guard that even diffused light can have very little upward slant. Hence even if unshielded by the wheel, it would not reach the eyes of the driver of an approaching automobile except from a great distance.

One of the advantages of this location and also of the flat form of the lamp is that a narrow vertically diffused beam may be used, lighting the right-hand edge of the road and gutter from the front wheel forward any reasonable desired distance depending on the strength of the lamp. The advantage of having a continuous lighted region of this sort, instead of an intensely lighted spot a considerable distance ahead of the car, will be obvious to any user.

The lamp reflector is parabolic vertically and preferably transversely also; that is to say, it may be like the parabolic reflector of an ordinary headlight intersected by two plane sides two or three inches apart parallel with each other and with the axis of the parabola, on opposite sides of the latter. If desired, however, a cheaper and quite effective device will result where the rear reflector is parabolic in the vertical plane only, the transverse contour being parallel straight line elements. Such construction may be attained by merely bending a flat strip of metallic mirror. It will be obvious that in referring to the reflector as parabolic I do not necessarily limit myself to an exact parabola which, as will be understood by those skilled in the art, is really unnecessary because the filaments of headlight lamps are seldom concentrated enough to be capable of localizing very near the focus of the parabola.

My invention also includes a very cheap, convenient mounting which, so far as concerns the useful angles, is to all intents and purposes universal, yet without any of the complications of the universal joint. The mounting consists of a rigidly attached bracket element which is flexible transversely, secured to the outer vertical flange of the mud guard by a bolt giving desired pivotal adjustment in the vertical plane.

The above and other features of my invention will be more readily understood from the following description in connection with the accompanying drawings, in which—

Fig. 1 is a diagrammatical side view of the forepart of an automobile showing the relation of my gutter light to the right front mud guard and wheel.

Fig. 2 is a top plan view of the same.

Fig. 3 is a vertical section through the lamp showing the construction thereof and its relation to the mud guard which is shown in dotted lines.

Fig. 4 is a section on the line 4—4, Fig. 3.

Fig. 5 is a rear elevation of the lamp shown in Fig. 4 on a smaller scale.

Fig. 6 is a section on the line 6—6, Fig. 3, showing the method of attachment of the lamp to the mud guard flange.

In these drawings the lamp 1 is shown as secured to the outer flange 2 of the right front mud guard 3 at a point above the level of the running board 4 and outside of the plane of the right front wheel 5.

While considerable variations in the height of the lamp is permissible, I prefer the location about as shown which is slightly above the level of the hub 6 but considerably below the level of the top of the tire. In this position the highest ray X that can clear the tip 7 of mud guard 3 has only a slight upward slant and such ray cannot reach the eyes of an approacher even dead ahead except at a considerable distance from the car. Hence even the intense ray that might proceed in this direction with the lamp adjusted as shown in Fig. 3 would be unobjectionable. In the more inclined position of Fig. 1 this ray would be too faint to be objectionable, however close the observer might be.

As indicated in Fig. 2, the lamp is housed under the mud guard within the plane of the outer edge thereof. While this is desirable as protecting the lamp from possible damage more or less lateral projection outside of the edge of the mud guard would be entirely practical.

The lamp is mounted by means of a stiff bracket member 8 which may be in the form of a strip of heavy rolled metal spot welded to the side of the lamp over a large area. It is entirely possible to have this bracket a rigid casting but for the universal adjustment above described, it is preferably of such material and dimensions that, while perfectly rigid in a vertical plane, it is both springy and bendable laterally. As indicated in Figs. 3 and 6, it is secured to the outer flange of the right mud guard 2 by a bolt 9 and nut 10; a spring washer 11 may be interposed if desired. The advantage of the single bolt is the ready adjustment for throwing the strongest light either near the wheel, as indicated in Fig. 1, or much further ahead, as indicated in Fig. 3, but it is evident that where this adjustment is unnecessary or undesired, two or more bolts may be used; also the bolt 9 may be used as a pivotal bolt and a second adjustable bolt may be used for locking the desired parts in adjustment.

In this location the springiness of the mud guard as also the springiness of the attaching member 8 is of great advantage for relieving and absorbing vibrations, thereby prolonging the life of lamp filament, as well as parts of the reflector and support.

As shown in the drawings the lamp itself comprises a relatively narrow, shallow outer casing which may be a casting or stamping or may be built up from flat sheet metal by brazing the flat sides 11, 11, to the curved rear wall 12. In quantity production a drawn metal cup will probably be found the most economical in manufacture as well as the most desirable in use. The drawings show the integral cup with integral outwardly bent annular flanges 13, 13, reversely bent as at 14, to form clamping grooves for the transparent front 15 which is preferably a plane sheet of clear glass. A socket 16 which may be of standard construction extends through the rear wall of the casing and may be secured in any desired way as by brazing at 17. The exterior end of the socket has the usual bayonet connection for a circuit terminal plug 18 and a similar bayonet connection at the other end for the lamp base 19.

Within the casing is the reflector preferably of silvered sheet metal. The reflector includes the rear member 20 which is preferably curved and preferably approximately parabolic longitudinally and which is shown in Fig. 4 as approximately parabolic transversely. It may be in all respects the same as a segment or zone cut from an ordinary automobile headlight. Preferably it has secured to it the parallel sides 21 which are preferably plane metallic mirrors.

The reflector is held in the casing by flanges 22 at the top and 23 at the bottom which flanges preferably form seats for the glass front 15. The glass is preferably slid into grooves 13, 14, endwise and is retained by a movable channel member 25 secured to the casing 10 as by screws 26 engaging a threaded bar or strip of metal 27 which may be brazed to the casting if desired.

While the size and proportions of the lamp may be varied considerably, I prefer to have the front face of the lamp two or three inches wide by six or seven inches high and the depth may be two or three inches. A two inch internal width by a two inch internal depth will be found highly desirable as giving a substantial size and power for the lamp and yet have it suitable for use on a great variety of commercial types of automobiles. On the average automobile it will permit locating the lamp higher up on the mud guard than indicated in Fig. 1, if this be desired.

It will be noted that the attaching arm or bracket 8 is located substantially above the center of gravity of the lamp so that when the lamp hangs in the position shown in Fig. 1, the rotary component of the gravity pull on the clamp at 2, 8, 9, 10, 11, is decreased and in certain of the angular positions may be very small. It will be noted that the bracket is secured on one side only of the lamp and in such a position that it is perfectly adapted for attaching the lamp in my preferred location; namely, the flange of the rear slope of the right-hand mud guard.

I claim:

The combination with a vehicle, of a mudguard positioned in relation to one of the wheels of the vehicle and a relatively high narrow lamp secured beneath the mudguard in a position to the rear of and below the apex thereof and laterally outside of the wheel, said lamp comprising a parabolic reflector having flat, vertical, parallel sides positioned within a casing of substantially similar form, and means for securing the lamp adjacent the outer edge of the mud-guard, whereby lateral spread of the beam of light from the lamp toward the centre of a roadway will be masked by the wheel and upward spread of the beam will be masked by the mud-guard.

Signed at New York in the county of New York and State of New York this twentieth day of October A. D. 1922.

GEORGE MARTIN ROSEMIER.